J. W. LEDOUX.
AIR VALVE.
APPLICATION FILED APR. 19, 1906.

939,277.

Patented Nov. 9, 1909.

WITNESSES:

INVENTOR
John W. Ledoux
BY
Charles N. Butler
ATTORNEY.

UNITED STATES PATENT OFFICE.

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

AIR-VALVE.

939,277.

Specification of Letters Patent.   Patented Nov. 9, 1909.

Application filed April 19, 1906.   Serial No. 312,540.

*To all whom it may concern:*

Be it known that I, JOHN W. LEDOUX, a citizen of the United States, residing at Swarthmore, in the county of Delaware and State of Pennsylvania, have invented certain Improvements in Air-Valves, of which the following is a specification.

This invention is an automatic valve for permitting the escape of air or gas from a liquid container while preventing the escape of the liquid.

In its preferred application it comprises a balanced hollow vessel connected with a conduit and having a valve for controlling the outlet therefrom, the valve being automatically opened to permit air or gas to escape from the conduit through the vessel and closed to prevent the escape of the liquid of heavier gravity.

Figure 1:
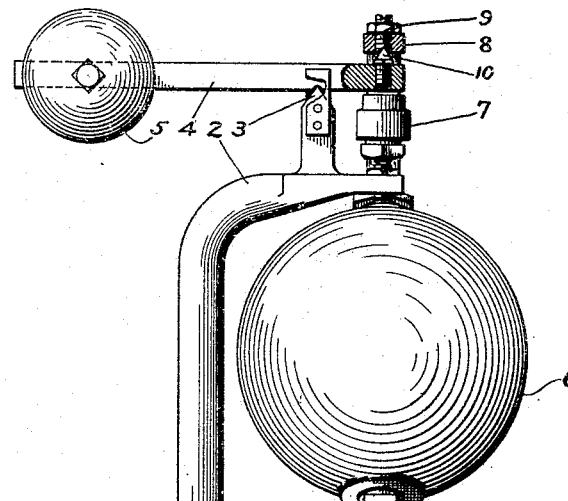
Figure 2:
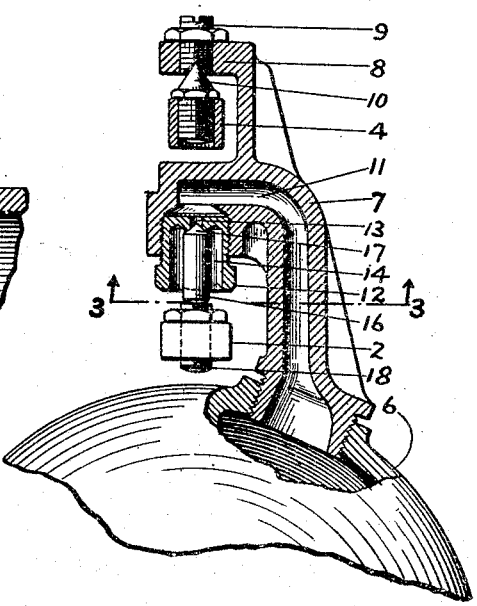
Figure 3:
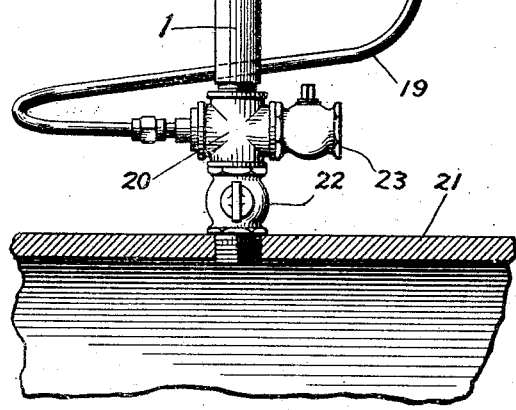

In the accompanying drawings, Figure 1 is a sectional elevation representing the invention, Fig. 2 is a sectional elevation at right angles to the position in Fig. 1 with connected details, and Fig. 3 is a sectional view on the line 3—3 of Fig. 2.

The apparatus comprises the standard 1 having the arm 2 provided with the knife edge bearing 3 on which is fulcrumed the lever 4 provided with the adjustable poise 5 on its long arm.

A vessel 6, preferably in the form of a hollow globe, is provided with a neck or hanger 7 having set in the head thereof an adjustable conical bearing 9, which engages an adjustable pivotal bearing 10 carried by the short arm of the lever. A passage 11 in the neck leads from the vessel 6 to a threaded bushing or thimble 12 set therein; the latter having the port 13, the passages 14, and the race 15 by which the port communicates with the passages. A cylindrical pin 16, with a conical top 17 fitting the correspondingly formed seat of the port 13, works in the race 15 and controls the port, the pin being supported at the desired elevation by the adjustable bearing 18 set in the end of the arm 2.

A flexible tube 19, preferably a coil of copper, is connected at its upper end with the lower part of the vessel 6 and at its lower end with a coupling 20 screwed on the lower end of the standard 1 and connected with a conduit 21, the coupling being provided with the valve 22 controlling an inlet thereto and the valve 23 controlling an outlet therefrom.

In the normal operation of the mechanism, with the valve 22 open and the valve 23 closed, any air in the conduit 21 is permitted to escape through the coupling 20, the tube 19, the vessel 6, and the neck 7, the port 13 being uncovered as the balance holds the vessel in the elevated position while the vessel is wholly or partly filled with air. Water flowing in expels the air from the vessel 6 and causes the latter to descend when the weight is sufficient to raise the poise 5, upon which the port 13 is brought down on the valve 16 and closed to prevent the escape of water, the port being opened again upon the rise of the vessel due to the accumulation of air therein and the consequent expulsion of water therefrom.

The valve 23 provides independent means for effecting a discharge from the conduit, and the valve 22 permits the passage from the conduit 21 to be cut off.

Having described my invention I claim:

1. An air valve comprising a coupling, a standard supported by said coupling, a balance supported by said standard, a vessel supported by said balance, and a coiled tube leading from said coupling to said vessel.

2. A reciprocating vessel, a flexible tube leading thereto, a passage leading from said vessel and terminating in a port having a conical seat, and a stationary valve having a conical point which fits said seat and closes said valve, said port moving away from said valve point clear of said valve and opening said passage on the rise of said vessel.

3. A standard, a reciprocating vessel, means supported by said standard for balancing said vessel, a flexible tube leading to the bottom of said vessel, a passage leading from the top of said vessel, said passage terminating in a port, and a stationary valve carried by said standard for controlling said port, said port being moved away from said valve to open said passage on the rise of said vessel.

4. A vessel, means comprising a lever for balancing said vessel, a passage leading to said vessel, a passage leading from said vessel and terminating in a port having a conical seat, and a valve comprising a stationary pin having a conical point fitting said seat to control said port, said port being moved away from said valve point to open said passage on the rise of said vessel.

5. A standard, a reciprocating vessel, means supported by said standard for balancing said vessel, a coiled flexible tube leading to the bottom of said vessel, a passage leading from the top of said vessel and terminating in a port having a conical seat, and supported by said standard a valve in the form of a pin having a conical point, said port being moved away from said valve point to open said passage on the rise of said vessel.

In witness whereof I have hereunto set my hand this 14th day of April, 1906, in the presence of the subscribing witnesses.

JOHN W. LEDOUX.

Witnesses:
CHARLES N. BUTLER,
CARLYLE H. ROSS.